Oct. 3, 1939. N. C. WADE 2,174,955

PLANT SUPPORT

Original Filed Nov. 19, 1936

Inventor
Newman C. Wade
By Fetherstonhaugh · Co.
Attorneys

Patented Oct. 3, 1939

2,174,955

UNITED STATES PATENT OFFICE 2,174,955

PLANT SUPPORT

Newman C. Wade, Summit, N. J., assignor of one-half to Carl R. Hausner, Summit, N. J.

Original application November 19, 1936, Serial No. 111,725, now Patent No. 2,134,242, dated October 25, 1938. Divided and this application July 1, 1938, Serial No. 217,056

4 Claims. (Cl. 47—47)

This invention relates to an improved means for securing the stem of a plant or the like in guided relationship to a fixed supporting standard such as a stake or rod driven into the ground in proximity to the plant which it is desired to support.

An object of the invention is the provision of an improved plant support having means for securing the same in fixed relationship to a supporting standard and equipped also with means for guiding a plant stem and retaining the same against undue bending or swaying.

This application is a division of my copending application Serial No. 111,725, filed November 19, 1936, which has matured into Patent No. 2,134,242 dated October 25, 1938.

In all forms of the invention the structure comprises a stay having a central shank portion arranged at its opposite ends with seats adapted respectively to be engaged with a fixed supporting standard and the stem of a plant or the like. The device preferably is constructed of light durable metal and may be in strip or wire form. Likewise, the device may be constructed of malleable metal so that it is flexible or in some instances it may be constructed of stiff metal possessing resilient characteristics.

Figure 1:
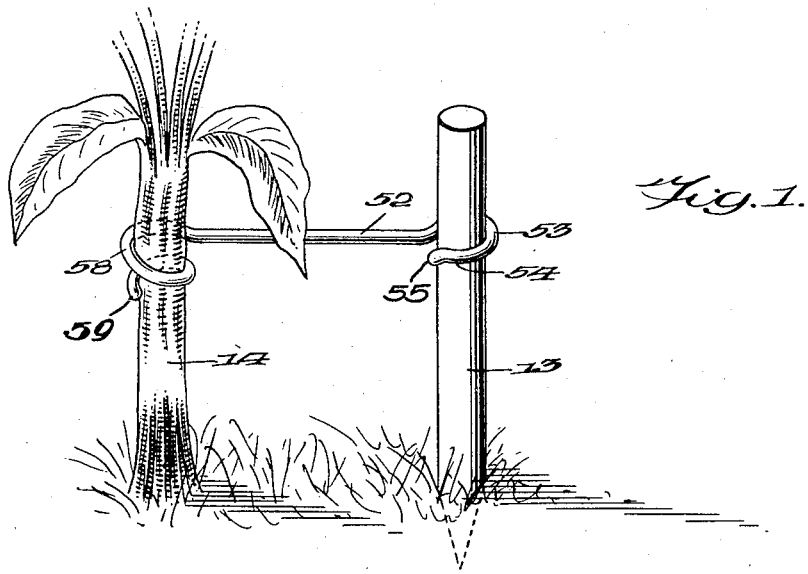
Figure 1 is a perspective view of an embodiment of the invention as mounted in service.
Figure 2:
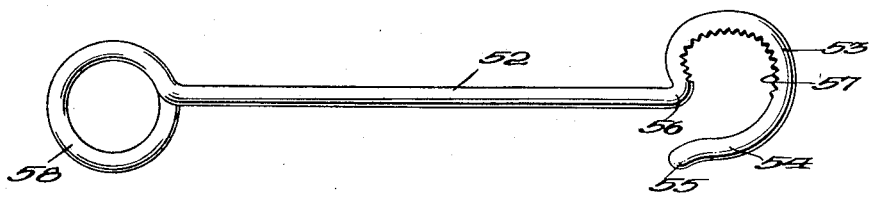
Figure 2 is a top plan view of the support as shown in Figure 1.

As illustrated in Figures 1 and 2, the improved plant support, or stay, is constructed of wire formed at one end for engagement with a ground stake or other supporting standard 13 which is driven into the ground in proximity to the stem 14 of a plant or flower that is to be supported.

The stay comprises an elongated wire shank 52 having at its standard engaging end a loop 53 whereof the major area is disposed at one side of the shank, the loop being disposed in the plane of the shank and terminating in a bill 54 provided with an outwardly flared tip 55, the bill extending inwardly in parallel spaced relation to the shank to provide a passage for receiving the body of the standard 13 when the device is slipped thereover. The bill 54 extends inwardly past the shoulder 56 provided at the starting end of the loop. The inner surface of the loop 53 is roughened or serrated as at 57 for biting engagement with the body of the standard.

At its opposite or plant stem engaging end the shank 52 is formed as a loop spiral 58 having one or more convolutions spaced sufficiently to permit free entry therebetween of the stem of a plant 14 with which the stay is engaged in service. The spiral loop 58 terminates in a rounded tip 59. In applying the stay the leading end of the spiral is first engaged with the plant stem and is threaded thereon in the usual manner with the stem riding between the convolutions, after which the shank is directed to the supporting standard and slipped thereover to engage the seat or loop 53.

Figure 3:
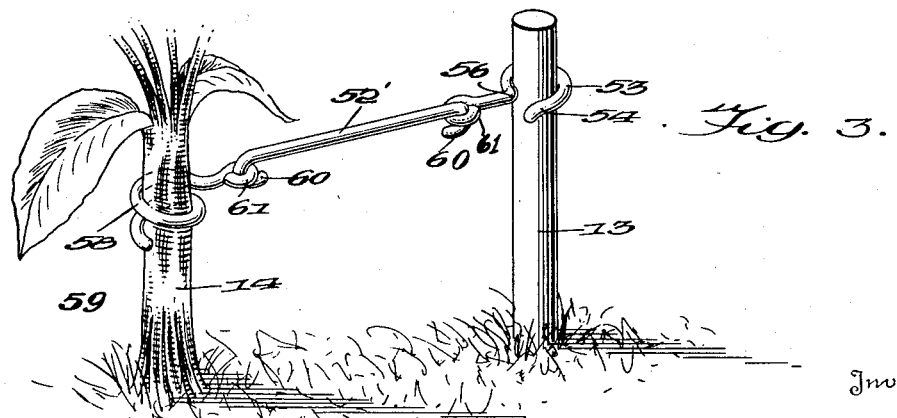
Figure 3 is a perspective view illustrating an alternative embodiment of the support.

In the alternative embodiment shown in Figure 3, the structure of the plant engaging loop 58 and the standard engaging loop 53 is identical with the form shown in Figures 1 and 2, the only difference being that the shank 52' is an independent member being provided at each end with hooks 60 arranged to engage in eyes 61 provided in the adjacent ends of the respective loops, the resultant structure being a three part assembly. This provides for a degree of flexibility in the stay connection between the supporting standard and the plant stem.

I claim:

1. A plant supporting stay comprising a metal wire member including a shank, a partial loop formed at one end thereof to engage a supporting standard a spiral loop provided at the other end of said shank and arranged to engage a plant stem in loosely supported relation, the distance between the convolutions of the spiral loop being substantially equal to the diameter of the loop.

2. A plant supporting stay comprising a length of wire bent at one end to provide a partial loop arranged to engage a supporting standard, the inner face of said engaging loop being provided with means for biting engagement with the surface of an engaged standard, said wire terminating at its opposite end in a spiral loop arranged to engage a plant stem in loosely supported relation, the distance between the convolutions of the spiral loop being substantially equal to the diameter of the loop.

3. A plant supporting stay comprising a length of wire provided at its opposite ends with hooks, a standard engaging loop having a terminal portion thereof formed as an eye for detachable engagement with one of said hooks, and a plant stem engaging portion formed as a spiral loop and having a terminal portion thereof provided with an eye for detachable engagement with the other of said hooks.

4. A plant supporting stay comprising a shank member, a standard engaging seat on one end thereof and being of at least partial loop form, said seat providing standard sustaining and confining shoulders at both the inner and outer ends thereof and transversely of the axis of the shank whereby to prevent relative movement of said seat and standard transversely of the seat and lineally of the shank, the major portion of said seat being disposed laterally at one side of the shank and having an entrance opening parallel with the shank at the opposite side thereof and adjacent thereto, and a plant stem engaging spiral loop at the other end of the shank member.

NEWMAN C. WADE.